United States Patent Office 3,394,093
Patented July 23, 1968

3,394,093
WATER-SOLUBLE AMINOPLAST RESIN PRODUCED BY TWO STAGE PROCESS AND COMBINATIONS INCLUDING THE SAME
Alexander N. Salem, Brecksville, Ohio, assignor, by mesne assignments, to Mobil Oil Corporation, a corporation of New York
No Drawing. Filed Apr. 1, 1965, Ser. No. 444,823
15 Claims. (Cl. 260—21)

ABSTRACT OF THE DISCLOSURE

Water-soluble aminoplast resin are produced by reacting polyfunctional amines such as melamine with at least three molar proportions of formaldehyde and at least three molar proportions of either methanol or ethanol. The reaction is conducted in two stages with the first stage being acidic (pH 5.7–6.7 measured as soon as the amine is fully dissolved) and the second stage having an initial alkaline pH of 7.5–11.0. The product is desirably used in aqueous solution in combination with a small proportion of a water soluble soap of a volatile nitrogenous base with a carboxyl-containing resin having an acid number of 30–100. This solution is useful to impregnate fibrous sheets and the resins advance to a "B" stage by drying at elevated temperature to provide a dried sheet useful for laminating.

The present invention relates to water-soluble amino resins, especially methylated melamine formaldehyde condensation products having unique properties as a result of their production by a specific two-stage reaction and to combinations thereof with water-soluble carboxyl-containing resins which provide outstanding properties when impregnated into a fibrous support and advanced to an intermediate stage of resinification to yield stable materials adapted for use as a protective coating by lamination to an underlying substrate using heat and pressure to advance the cure and provide strong, durable and chemically resistant finishes.

The present invention includes numerous features. A primary object is to enhance the production of decorative laminates. Stated as simply as possible, it is desired to provide a stable resin which can be diluted with water or mixtures of water and water-miscible organic solvents and which will be stable in water in the presence of a curing catalyst to eliminate the need for extraneous catalyst and which can be impregnated into a fibrous base and advanced to an intermediate or "B" stage to provide a flexible product which will not adhere to itself and which is non-powdery so that it can be rolled upon itself and stored for long periods of time. Despite all of these properties, the impregnated fibrous stock in its intermediate or "B" stage should be highly reactive in order to cure rapidly under the application of modest temperature and pressure to provide a surface layer of outstanding properties.

It is the achievement of this objective as well as ancillary objectives which is the subject of the present invention.

In accordance with the invention, a polyfunctional amine, such as melamine, is reacted with at least 3 moles of formaldehyde per mole of melamine in the presence of sufficient methanol or ethanol for water solubility. The reaction is essentially effected in two stages, first at a controlled acid pH, and second at a controlled alkaline pH. The first stage of reaction is carried out until the amine is fully solubilized and reacted substantially to equilibrium. The second stage of the reaction is less sensitive as will be discussed hereinafter. The completed resin is then concentrated by removal of alcohol and diluted with water to provide a solution which is stable even in the presence of catalytic proportions of acidic resins. The catalyzed solution is impregnated into a fibrous support and dried at elevated temperature to advance the cure of the resin to an intermediate or "B" stage in which the resin is water insoluble though capable of significant flow at elevated temperatures under pressure. The impregnated "B" stage product is adapted to be superimposed over a decorated sheet or a decorated surface and laminated thereto under heat and pressure to provide the protective surface coverings which are the primary contemplation of the invention.

The invention is applicable to any polyamine having at least three aldehyde-reactable amino hydrogen atoms. Such amines are preferably illustrated by triazines, melamine being particularly preferred and used to illustrate the class. Other triazines which may be used include benzoguanamine, acetoguanamine, formoguanamine, and substituted melamines such as monoethyl melamine and monotetriary-butyl melamine. A portion of the triazine, up to about 50 mol percent may be replaced by urea or other similar polyamine without undue detriment.

The formaldehyde component is preferably supplied in the form of a solution thereof in a lower alcohol such as methanol or ethanol. Such solutions are available in commerce containing dissolved formaldehyde in amounts of from 40 to 60 percent by weight. A solution known as methyl Formcel and which contains about 55 percent by weight of formaldehyde in methanol is particularly preferred, such product containing a small proportion of water.

While it is preferred to have the formaldehyde in solution prior to reaction, it is permissible to dissolve the formaldehyde in situ as by the use of paraformaldehyde. Similarly, agents generating formaldehyde at the elevated reaction temperature can also be used such as hexamethylenetetramine and trioxane.

The polyamines which are used, such as melamine, contain a plurality of amino hydrogen atoms which are reactive with formaldehyde and the amount of formaldehyde used is preferably approximately that dictated by stoichiometry, e.g., 1 mole of formaldehyde per equivalent of amino hydrogen atom available for reaction. Smaller proportions of formaldehyde can be used, e.g., at least 3 moles of formaldehyde per mole of polyamine in order that the condensation reaction will generate a plurality of reactive methylol groups. Excess formaldehyde beyond that dictated by stoichiometry can be tolerated, but such excesses can become wasteful and are not preferred.

The preferred alcohol is methanol. Ethanol can be used, but this is significantly less preferred. There should be at least one mole of alcohol for every two moles of formaldehyde, but preferably equimolar proportions are used, especially when the amount of formaldehyde is minimized. Thus, at least three moles of alcohol should be used for each mole of amine. Excess alcohol can be tolerated, but is wasteful since excess unreacted alcohol is removed by distillation when resin production is completed.

In the present development, it is necessary to have all of the components which are to be reacted together present substantially from the start of the reaction. This is because the invention relies upon equilibriums being established in a particular sequence involving several competing reactions. This equilibrium is established first under carefully controlled acidic conditions and then under carefully controlled alkaline conditions. If any of the components were withheld and introduced after the reaction had proceeded to any significant extent, or if the conditions of the reaction are changed, then different products are produced.

Reaction temperature is subject to variation. Reflux temperature is preferred since it provides a uniform and reasonably rapid reaction providing a product which can be accurately duplicated from one run to another. Less elevated temperatures are also useful, but the reaction is slower. More elevated temperatures with pressure to maintain the liquid phase are also useful, but equipment and control problems counterbalance the more rapid reaction obtained in this way.

The acidity of the first stage of the reaction must be carefully regulated. If the reaction mixture is to acidic, the product is excessively resinous and the finished product possesses lowered water tolerance. In the absence of the required acidity, e.g., if the reaction mixture were slightly alkaline, the reaction would tend to continue past the water-soluble stage and precipitate out of solution. Also, methylolation occurs excessively in alkaline medium and excessive proportions of alcohol are required for subsequent etherification which is uneconomic.

As previously indicated, the first stage of the reaction is conducted at slightly acid pH. However, pH fluctuates as the amine component goes into solution and it is convenient for reproducibility to measure pH when all of the amine component, e.g., the melamine, is dissolved which normally occurs sometime after reflux temperature is reached which varies with the materials selected and their proportion. Measured at this moment, the pH of the reaction mixture during the first stage of the reaction should be in the range of pH 5.7–6.7, preferably 5.8–6.0. By experience one can quite accurately predict the pH which will be obtained from the pH of the initial mixture.

All pH measurements are made by use of a standard pH meter, e.g., a Beckman pH meter employing a glass electrode.

Normally, a pH in the approximate range of 3.8–5.0 for the methyl Formcel component used in preferred practice will supply the desired pH at the moment the melamine dissolves. As we go to greater acidity, the viscosity of the resin in the first stage of the reaction increases and water solubility decreases. As the reaction mixture becomes less acid, water solubility increases until, with too little acidity, stability falls off.

This first stage acid reaction must proceed to substantial completion. This is normally achieved in about two hours of refluxing at atmospheric pressure. Completion of the reaction can be noted by observing the failure of further change in the reaction mixture with time.

The second stage reaction is essential to complete the production of the desired condensate. Thus, and after equilibrium is reached in the first stage, any alkaline agent, such as sodium hydroxide, is added to adjust the pH to the alkaline side. As the second stage reaction is completed, the pH drifts close to neutral and a convenient measure of the desired adjustment of alkalinity is the achievement of a final pH of from 7–8. The pH at the time of adjustment will normally be within the range of about pH 8.0–9.0 though the initial pH may broadly range from pH 7.5 to pH 11.0. The second stage of the reaction proceeds more rapidly with increasing pH. At pH 9.0, the mere removal of excess unreacted methanol by distillation at atmospheric pressure will provide sufficient reaction time, but it is preferred to employ a pH of about 8.5 and to insure product stability by refluxing for at least about 15 minutes before applying more rapid heating to distill away excess alcohol. While vacuum is not needed for distillation, it can be used.

Excess alcohol is removed to drive the reaction forward and also for economy since both methanol and ethanol are water-miscible. Removal of excess alcohol also causes the removal of unreacted formaldehyde which is advantageous. It is convenient to remove alcohol until the resin solids content of the solution is about 90% by weight and then to add water to provide a 70% by weight aqueous solution for storage. Thereafter, the solution is diluted with water or a mixture of water and alcohol or other water-miscible organic solvent to provide the viscosity or solids content desired for impregnation.

It does not appear as though a complete reaction is obtained. Thus, from stoichiometry, one might predict the production of hexamethoxy methyl melamine from the molar ratio 1:6:6 of melamine:formaldehyde:methanol, but this does not appear to be the case. Thus, commercially available products indicated to be hexamethoxy methyl melamine are useless in the invention. Examining the product produced using the ratio 1:6:6, this product contains 4.93 moles of combined formaldehyde and 2.5 moles of combined methanol for 1 mole of melamine, unlike the commercial hexamethoxy methyl melamine products.

The condensates provided as discussed hereinbefore are desirably catalyzed with an acid catalyst for enhanced curing reactivity and, in this sense, are similar to known melamine-formaldhyde condensates and other aminoplast resins. Thus, catalysts such as zinc sulfate, paratoluene sulfonic acid and phosphoric acid can be used if storage stable water solutions are not required. On the other hand, the conventional aminoplast resins are not catalyzed by small amounts, e.g., 0.5–10%, preferably 2–5% by weight of slightly acidic carboxyl-containing resins as are the condensates of the invention. By the use of such carboxyl-containing resins, the condensates of the invention are effectively catalyzed, but storage stability is not impaired.

Any carboxyl-containing resin of low to moderate molecular weight may be used, especially those which are highly soluble in aqueous alkaline medium and of limited acid value as indicated by an acid number of from 30–100, preferably from 40–80. Polyester resins are particularly preferred for this purpose, but maleinized or fumarated oils, e.g., fumarated soya oil and water-soluble copolymers thereof, can be used as well as acidic copolymers containing 2–20% by weight of copolymerized acid such as acrylic, methacrylic or crotonic acids. The balance of the copolymer would be desirably constituted by short chain alkyl esters of the same acids such as ethyl acrylate. Other monoethylenic monomers which do not disrupt water solubility are also desirably present such as styrene, a-methyl styrene, vinyl toluene, butyl acrylate and methacrylate, etc.

Preferred carboxyl-containing resins for use in the invention are acidic polyester resins which can be formed by the polyesterification reaction of an aliphatic diol such as propylene glycol with a polycarboxylic acid containing three or more carboxyl groups per molecule such as trimellitic anhydride and a fatty acid such as cocoanut fatty acid, tall oil fatty acids, soya fatty acids, linseed fatty acids, palmitic fatty acid, lauric fatty acid, etc. The polyesterification reaction materials and proportions are selected so as to provide approximately the same carboxyl functionality as hydroxyl functionality, though a small excess of carboxyl functionality can be tolerated. The polyesterification reaction is continued until the acid value is reduced to within the range noted hereinbefore. When the polyesterification reaction is completed, the product is cooled and thinned with an aqueous alkaline solution which is preferably constituted by water containing dissolved volatile nitrogenous base. While ammonia may be used, it is preferred to employ amines such as dimethyl ethanol amine, this being a particularly preferred agent. Other amines which may be used are illustrated by triethyl amine, diethyl methyl amine and trimethyl amine.

The alkaline agent can be any volatile nitrogenous base which forms a soap with the acidic resin. This soap formation permits the condensates of the invention to be stable in aqueous solution and the soap also appears to provide a valuable release function helping the final laminate to separate cleanly from the metal caul plates used to apply the required laminating pressure. Thus, extraneous release agents are not needed and the caul plates do not require separate treatment and their useful life is increased.

The proportion of soap-forming nitrogenous base is desirably sufficient to react with all of the carboxyl groups on the carboxyl-containing resin, preferably a small excess being used to provide a final pH of from 7 to 7.5.

The trimellitic anhydride-diol-fatty acid polyesters are particularly desirable when about 1 to 5% of the total carboxyl functionality is supplied by a monofunctional fatty acid.

While propylene glycol is a preferred glycol, ethylene glycol, diethylene glycol, triethylene glycol, dipropylene glycol, butylene glycol and dibutylene glycol will illustrate other glycols which may be employed, though there is a wide diversity of glycols known to the art for the production of water soluble polyesters and any of these can be used. Moreover, and while the invention will be later illustrated employing a preferred polyester as discussed above, the fact that only small amounts of the polyester are used, and then primarily for their catalytic quality, is strongly suggestive of the fact that the specific details of the water soluble carboxyl-containing resin are of secondary significance.

It is desired to stress the fact that the invention provides thermosetting coatings using the special aminoplast resins of the invention essentially alone and in the absence of any large proportion of other resin component. To the contrary, and unlike conventional aminoplast resins, only a trifling catalytic proportion of the carboxyl-containing resin is used insufficient to qualify as a co-reactant.

As should be evident at this point, two water solutions are provided. One of these contains the stable aminoplast resin produced by the two-stage reaction discussed hereinbefore. The second contains the water soluble carboxyl-containing resin in solution in the form of a soap with a volatile nitrogenous base. These two water solutions are adjusted by diluting the same with water to provide the solids content desired and the two are mixed together to provide a resin solids ratio of from 90:10 to 99.5:0.5 as previously discussed. This mixture is stable and can be stored until needed. As a matter of interest, acid-catalyzed mixtures of the prior art are frequently insufficiently stable to last a single day whereas the mixtures of the invention are easily stable for a month or more.

The catalyzed solutions of the invention, conveniently at a resin solids content of about 60-70% by weight, are used to impregnate fibrous materials, these being illustrated by paper, cotton, synthetic fibers, asbestos paper and cloth, glass fibers, wood flour, mineral and glass wool, etc. While the ratio of fiber weight to weight of applied resin may vary considerably, it is convenient to provide products in which the "B" stage impregnated product contains 70% by weight of resin, but, of course, the end use of the product will determine considerable variation. The important point is that the applied resin is dried at elevated temperatures, temperatures of from 180-300° F. for a period of time sufficient to advance the cure of the resin to a "B" stage in which the product is sufficiently cured as to lose most of its solubility in water being suitable. On the other hand, the degree of resinification cannot be so extensive as to prevent flow upon the application of moderate temperature and pressure, e.g., 300° F. at 250 p.s.i. This degree of resinification is easily achieved by driving the impregnated and mangled fibrous material for four minutes using countercurrently flowing air at 275° F.

This precured or prestaged impregnated stock is of considerable importance. First, it is a stable product. Second, and unlike comparable products of the prior art, the prestaged stock materials of the invention are flexible and not brittle. Indeed, the preferred products of the invention can be folded even without cracking illustrating the extensive departure from known products. This flexibility is obtained despite the fact that the resin has been cured to an extent to where it is no longer adherent to itself. This capacity to supply stable, prestaged products which are nonpowdery and nonadherent in roll form is of obvious importance.

Despite the remarkable stability of the products of the invention in water solution and as prestaged stock, the prestaged stock of the invention is remarkably reactive. To illustrate this, and using very modest curing temperatures in the range of 250-300° F. and pressures as low as 250-500 p.s.i., cures are obtained in a period of from 7-15 minutes. Comparing this reactivity with the materials of the prior art, the prior art would normally require pressures in the range of 800-1200 p.s.i., providing obvious advantage for the invention in the capacity to employ the invention upon substrates which are more highly compressible.

It is of interest to note that the curing reaction which is contemplated is a reaction under heat and pressure. When pressure is imposed in a condensation reaction, the water of condensation cannot flash off and this retards the reaction. As a result, the prior art required resins which tended to cure to form brittle products by virtue of the need for sufficient reactivity as to enable a rapid cure despite the presence of pressure. Also, these highly reactive materials were not adequately stable prior to the cure. In contrast, the invention provides more stable products capable of more rapid cure to provide less brittle products. As a matter of interest, the art counteracted unduly brittle resins by the use of many plies of phenolic-impregnated paper in the production of products of the nature of Formica, the need for such a large number of plies is eliminated by the invention to a considerable advantage.

The invention is illustrated in the examples which follow.

EXAMPLE I

Preparation of water-soluble melamine-formaldehyde resin

To a reaction flask equipped with an agitator, thermometer, and water cooled reflux condenser equipped with a trap for distillation of solvent at the end of the reaction, are charged 1 mole of melamine, 6 moles of formaldehyde as methyl Formcel (methyl Formcel by weight is 55% formaldehyde, 30% methanol and 15% water) and 6 moles of methanol (the proportion of methanol includes that amount present in the methyl Formcel solution). The charge is heated to reflux temperature of 80° C. and held for two hours. During this two hour period the melamine begins to react and go into solution at which time the pH of the mixture is acidic (5-5.5 as indicated by a standard pH meter). Following the two hour reflux, the pH of the solution is adjusted to a pH of 8.5-9 with a 10% aqueous solution of sodium hydroxide and refluxed for an additional two hour period during which period the pH drifts to neutral. The solvents are then distilled off by heating at atmospheric pressure to provide a 90% solids mixture which is then reduced with water to a 70% solids solution.

EXAMPLE II

Preparation of a water-soluble polyester resin

To a reaction flask equipped with an agitator, thermometer, and steam condenser are added a mole ratio of 1 mole of coconut fatty acid, 8.83 moles of trimellitic anhydride, and 13.77 moles of propylene glycol. This reaction mixture is heated under an inert gas blanket ($CO_2$) to 350-360° F. and held for an acid value of 65. The esterification reaction product is cooled to below 212° F. and is water-solubilized with dimethyl-ethanol amine in a water solution, the amine being used in slight excess over the stoichiometric amount necessary to neutralize the free acid of the esterification reaction product so that a final pH of 7-7.5 is obtained. The solids content of the solution is adjusted to 50% solids.

EXAMPLE III

A cold blend of Example I and Example II is made using 138.57 parts by weight of the 70% solution of Example I (97 parts of resin) and 6 parts by weight of the 50% solution of Example II (3 parts of polyester). This blend may be used in impregnating paper stock to provide a prelaminate material.

EXAMPLE IV

A fibrous paper stock (an α-cellulose sheet having a thickness of 0.005 inch, a weight of 29 pounds per 500 sheets 24 x 36", and a pH in water of 5.25) is impregnated with the blend of Example III diluted to 60% resin solids content by the addition of water. The paper stock is run into a bath of the blend and the excess liquid is removed by squeezing the impregnated stock between a pair of mangle rolls. About 4 pounds of coating solution are picked up per pound of paper fiber. The wet stock is then dried by passing it through an oven in which air at a temperature of 275° F. is moved in a countercurrent direction for an exposure time of 4 minutes. This provides a final product in the "B" stage having a fiber content of about 30% by weight. The resin contains 7–8% by weight of volatile material and has lost most of its water solubility. The impregnated paper in the "B" stage is nonadherent to itself and is sufficiently flexible to permit the product to be rolled for storage and unrolled when needed without significant danger of cracking or breaking.

EXAMPLE V

A decorative laminate utilizing the product of Example IV is provided by superimposing the prestaged paper of Example IV over a hardboard and applying heat and pressure to cause the paper of Example IV to form a clear overlay bonded to the hardboard surface. Appropriate results can be obtained by the application of 350 p.s.i. for 13 minutes using stainless steel caul plates heated to 275° F. The exposed surface of the laminate so-produced conforms closely to the configuration of the pressure-imparting caul plate in contact therewith and the resin cures to provide a strong, durable and chemically resistant finish. It is desirable to skin coat the hardboard in order to fill any surface voids which may be present therein and it is also desirable to ground coat the hardboard surface to improve the reception of printing inks or for other decorative purposes.

The melamine-formaldehyde resins of the invention, especially when catalyzed as taught herein are useful for diverse purposes. Referring to Example V, the prestaged paper of Example IV is also useful on the back of the laminate to balance the same and to reduce warpage. Similarly, the prestaged paper of Example IV can be chopped and molded under heat and pressure to form molded articles. Similarly, the impregnating solution used in Example IV, either alone or in combination with other film-forming materials, is useful as an adhesive for paper and plywood, and as an impregnant in the processing of hardboard, fiber board and molded wood chip board.

The invention is defined in the claims which follow.

I claim:

1. A process for the production of water-soluble aminoplast resins comprising reacting at elevated temperature in the liquid phase:
   (1) polyfunctional amine having at least three aldehyde-reactable amino hydrogen atoms per molecule;
   (2) formaldehyde in an amount of at least three moles thereof per mole of said amine; and
   (3) an alcohol selected from the group consisting of methanol and ethanol, in an amount of at least 3 moles thereof per mole of said amine, there being at least one mole of alcohol for every two moles of formaldehyde;

said components (1), (2) and (3) being reacted to substantial equilibrium at acid pH and then at alkaline pH, said acid pH being in the range of pH 5.7–6.7 measured as soon as all of said amine has dissolved and said alkaline pH being initially in the range of from pH 7.5–11.0.

2. A process as recited in claim 1 in which said amine is melamine.

3. A process as recited in claim 2 in which said alcohol is methanol and said formaldehyde is employed as a solution thereof in methanol.

4. A process as recited in claim 3 in which the molar proportion of said components (1):(2):(3) is about 1:6:6.

5. A process as recited in claim 4 in which said acid pH is in the range of from 5.8–6.0 and is maintained as reflux at atmospheric pressure for about two hours.

6. A process as recited in claim 1 in which said alcohol is removed by distillation until there is provided an approximately 90% by weight solution.

7. The product of the process of claim 1.

8. The product of the process of claim 1 diluted with water.

9. An aqueous solution having dissolved therein a mixture consisting essentially of the product of the process of claim 1 and the water-soluble soap of volatile nitrogenous base and carboxyl-containing resin having an acid number of from 30–100, said carboxyl-containing resin being present in an amount of from 0.5–10% of the weight of the mixture.

10. An aqueous solution as recited in claim 9 in which said carboxyl-containing resin is a polyester resin produced by polyesterifying glycol tricarboxylic acid and fatty acid in approximately stoichiometric proportions.

11. An aqueous solution as recited in claim 10 in which said tricarboxylic acid is trimellitic anhydride, said fatty acid is present in an amount providing from 1 to 5% of total carboxyl functionality and the acid number of the polyester is in the range of from 40–80.

12. An aqueous solution as recited in claim 11 in which said base is dimethyl ethanol amine.

13. A fibrous sheet impregnated with the aqueous solution of claim 9 and dried at elevated temperature until most of the water solubility is lost and the product will not stick to itself.

14. A fibrous sheet as recited in claim 13 in which drying is effected at a temperature of from 180–300° F.

15. A fibrous sheet as recited in claim 14 in which paper is impregnated and dried for about 4 minutes.

References Cited

UNITED STATES PATENTS

| | | | |
|---|---|---|---|
| 2,385,383 | 9/1945 | Schroy | 260—67.6 |
| 2,470,363 | 5/1949 | Mohrman | 260—67.6 |
| 2,537,131 | 1/1951 | Grossman | 260—67.6 |
| 2,602,037 | 7/1952 | Nelb | 260—67.6 |
| 2,750,355 | 6/1956 | Ledden | 260—67.6 |
| 2,998,411 | 8/1961 | Housekeeper | 260—67.6 |

OTHER REFERENCES

Monsanto Plastics, Resimene, Development Bulletin X800-6, Sept. 1, 1944, pp. 1–4.

DONALD E. CZAJA, *Primary Examiner.*

R. W. GRIFFIN, *Assistant Examiner.*